Sept. 20, 1960

W. H. HORGAN 2,953,375

RIDING TOY

Filed Nov. 8, 1957

INVENTOR
WILLIAM H. HORGAN

*Caswell & Lagaard*

ATTORNEYS

United States Patent Office 2,953,375
Patented Sept. 20, 1960

2,953,375
RIDING TOY

William H. Horgan, Mound, Minn., assignor to Moulded Products, Inc., Maple Plain, Minn., a corporation of Minnesota Filed Nov. 8, 1957, Ser. No. 695,368

7 Claims. (Cl. 272—52)

The herein disclosed invention relates to riding toys and particularly to a hobby horse.

An object of the invention resides in providing a hobby horse which when ridden will simulate the movements of a galloping horse.

Another object of the invention resides in providing a hobby horse which will be stable and safe for the use of children.

A still further object of the invention resides in providing the body with forwardly and rearwardly disposed transverse bearings and in rotatably mounting therein shafts having shaft extensions at each end.

An object of the invention resides in providing a base underlying the body of the horse and in utilizing C-shaped springs each attached at one end to one of the shaft extensions and at its other end to said base.

Another object of the invention resides in constructing the springs as leaf springs with their upper ends extending across said shaft extensions and in further providing bolts or their equivalent extending through said shaft extensions and the upper ends of said leaf springs to secure the same together.

A still further object of the invention resides in constructing the base in the form of a frame having two spaced longitudinal frame members and in disposing the lower ends of the springs in overlying position upon the upper surfaces of said frame members and in further providing screws or similar fasteners extending through said springs and engaging said frame members to connect the springs to the frame members.

Other objects of the invention reside in the novel combinations and arrangement of parts and in the details of construction hereinafter illustrated and/or described.

Figure 1:
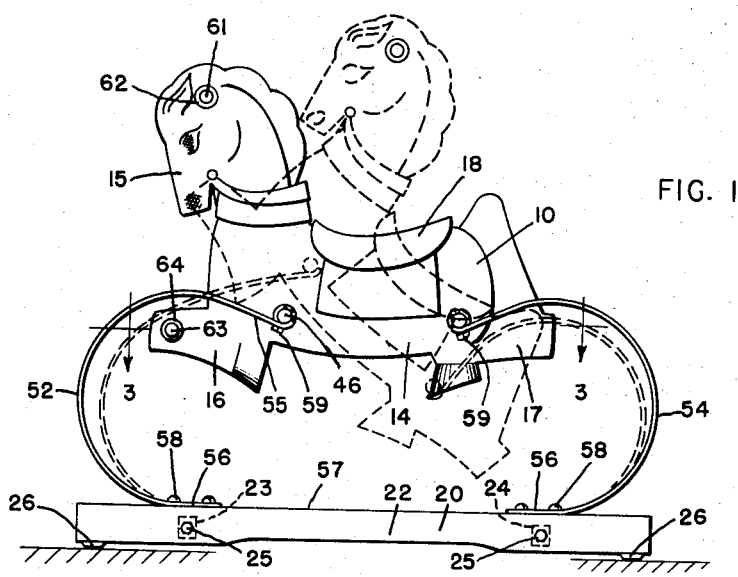
Fig. 1 is a side elevational view of a hobby horse illustrating an embodiment of the invention.
Figure 2:
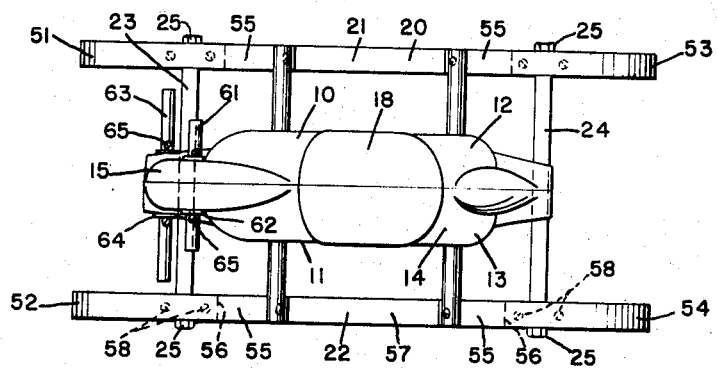
Fig. 2 is a plan view of the structure shown in Fig. 1.

The invention consists of a moulded body 10 in the form of a horse and preferably constructed of a fibrous plastic material. This body is hollow and is formed with a wall structure 11 made in two halves 12 and 13. The body 10 has an elongated portion 14, a head 15, and front and rear legs 16 and 17. The two halves 12 and 13 may be secured together by gluing or otherwise as desired. Mounted on the elongated portion 14 of the body 10 is a seat 18 on which the rider may be positioned.

The body 10 overlies and is supported on a base 20 which is constructed in the form of a frame having two longitudinal frame members 21 and 22. These frame members are spaced from one another and are connected together near their ends by means of crossbars 23 and 24. Lag screws 25 extend through the frame members 21 and 22 and are screwed into the crossbars 23 and 24 to provide a rigid frame construction. The ends of the longitudinal frame members 22 have secured to them rubber pads 26 which rest directly on the floor or other supporting surface on which the hobby horse is to be used.

Figure 3:
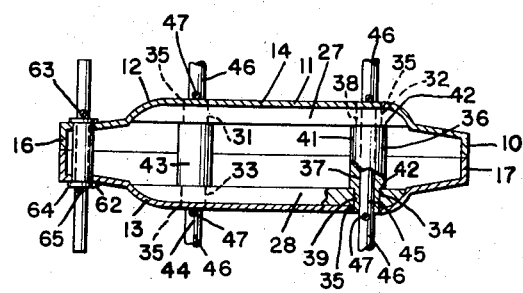
Fig. 3 is a fragmentary plan sectional view taken substantially on line 3—3 of Fig. 1.

Disposed within the interior of the body 10, as shown in Fig. 3, are two longitudinally extending ribs 27 and 28 and which are parallel and lie directly opposite one another. These ribs may be glued to the wall structure 11 or secured thereto in any other suitable manner. The rib 27 has two cylindrical holes 31 and 32 extending through the same and which are parallel to one another and are disposed transversely with reference to the body 10. The rib 28 is constructed with similar holes 33 and 34 which are coaxial with respect to the holes 31 and 32. The wall structure 11 is constructed with holes 35 which register with the holes 31, 32, 33 and 34. Disposed in the holes 32 and 34 is an elongated tubular bearing 36 which has a bore 37 extending completely through the same. The ends 38 and 39 of this bearing are received in the holes 32 and 34. The portion of the bearing 36 intermediate the ribs 27 and 28 is formed with an enlargement 41 which provides shoulders 42 engaging the inner surface of the ribs 27 and 28. These shoulders restrain axial movement of the bearing relative to the ribs 27 and 28. A similar bearing 43 is mounted in the holes 31 and 33. Rotatably mounted in the bearings 36 and 43 are two shafts 44 and 45 which extend completely through said bearings and the holes 35 in the wall structure 11 and which are formed with shaft extensions 46 at each end thereof. Screws 47 screwed into said shafts near the end of the bearings 36 and 43 serve to restrain axial movement of the shafts relative to the bearings. In the form of the invention shown, the shafts 44 and 45 are of a length substantially equal to the width of the base 20.

The body 10 is supported on the base 20 by means of four C-shaped springs 51, 52, 53 and 54. These springs have upper ends 55 and lower ends 56 which extend substantially horizontally. The ends 56 rest on the upper surfaces 57 of the longitudinal frame members 21 and 22 and are secured thereto by means of screws 58. The upper ends 55 of these springs underlie the shaft extensions 46 and are secured thereto by means of bolts 59 which extend completely through said shaft extensions and springs. The size of the springs depend upon the material used, the length of the spring and the weight of the rider. It has been found, however, that the performance may be considerably altered by making the front spring heavier than the rear spring. With all springs the same width and length and constructed of the same material, the front springs being eight percent thicker than the rear springs, produce an equalized action simulating a gallop. Front springs twenty percent thicker than the rear springs change the action to that of bucking. With the front springs being heavier than the denoted maximum value, the action becomes stiffer and slower and a less interesting ride results. With the front springs lighter than the denoted minimum value, the rider has the tendency to plunge forwardly and an unstable, uncomfortable ride results.

To assist the rider, a handle 61 is employed, which extends through the head 15 and is mounted in a bushing 62 which also extends through said head and is attached thereto. In a similar manner, a foot rest 63 is employed which is mounted in a bushing 64 attached to the front legs 16 of the horse. Screws 65 screwed into said handle and foot rest restrain longitudinal movement of the same relative to said bushings.

In the use of the hobby horse the rider seats himself upon the seat 18 straddling the body 10. With his feet upon the foot rest 63 and his hands grasping the handle 61, the rider throws his body in a back and forth direction causing the body 10 to flex the springs 51, 52, 53 and 54 to cause the body to travel from its normal position, as shown in full lines in Fig. 1, and to a rearward position, as shown in dotted lines, and a corresponding forward position. Through such movement, the body 10 simulates the movement of a galloping horse and provides entertainment and enjoyment for the rider.

The advantages of the invention are manifest. The device is extremely simple and can be manufactured at a nominal expense. By means of the C-shaped springs employed, a simple base can be used having no uprights to which springs are attached. In action the rider encounters no obstructions which would interfere with the use of the hobby horse. The particular construction illustrated prevents undue lateral movement, thereby making the toy exceedingly stable and safe for use. By detaching the springs, the entire hobby horse may be taken apart and packaged in an extremely small carton.

Changes in the specific form of the invention, as herein described, may be made within the scope of what is claimed without departing from the spirit of the invention.

Having described the invention, what is claimed as new and desired to be protected by Letters Patent is:

1. A riding toy comprising a body, a seat carried by said body, two spaced parallel bearings extending through said body transversely of said seat, a shaft rotatably mounted in each of said bearings, said shaft having shaft extensions at each end projecting outwardly beyond said body, a base in the form of a frame for disposition on a supporting surface and having longitudinal frame members extending along the supporting surface in close proximity thereto, and C-shaped leaf springs of a width greater than their thickness attached to said shaft extensions and having coplanar lower ends overlying and attached to said longitudinal frame members.

2. A riding toy comprising a base, a body overlying and spaced from said base, a seat carried by said body, forward bearing means and rearward bearing means carried by said body, the axes of said bearing means being parallel, a shaft rotatably mounted in each of said bearing means, a shaft extension at each end of each shaft, a number of C-shaped leaf springs having upper ends traversing and contacting said shaft extensions, bolts extending through the upper ends of said leaf springs and shaft extensions and engaging the same to hold the leaf springs rigidly attached to the shaft extensions, said leaf springs having lower ends overlying said base, and fastening means connecting the lower ends of said leaf springs to said base.

3. In a hobby horse comprising a hollow body formed with an outer wall structure, said wall structure being formed in two halves joined along the sagittal plane, the combination of a pair of oppositely facing longitudinally extending ribs disposed within said body and attached one of each half, said ribs each having two equally spaced transverse holes, each of the holes of one rib being coaxial with respect to the corresponding hole of the other rib, to form therewith a pair, the wall structure of said body having holes therein registering with the holes in said ribs, a tubular bearing extending transversely across said body at each pair of holes and having end portions received in said holes, means on said bearings forming shoulders engaging said ribs and restraining endwise movement of said bearings, shafts rotatable in said bearings and having shaft extensions projecting outwardly beyond said bearings, a base underlying said body and resilient means attached to the shaft extensions and to said base.

4. A riding toy comprising a base, a body overlying and spaced from said base, a seat carried by said body, forward bearing means and rearward bearing means carried by said body, the axes of said bearing means being parallel, a shaft rotatably mounted in each of said bearing means, a shaft extension at each end of each shaft, a number of C-shaped leaf springs having tubular loops formed at their upper ends receiving said shaft extensions, bolts extending through said loops and shaft extensions and engaging the same to hold the leaf springs rigidly attached to the shaft extensions, said leaf springs having lower ends overlying said base, and fastening means connecting the lower ends of said leaf springs to said base.

5. In a riding toy having an elongated base, an elongated body overlying said base and extending in the same direction, a seat on said body supporting the rider in a position straddling the body, said body being narrower than long, the combination of bearing means extending transversely through the body at localities above the lowermost portions thereof and disposed one forwardly of the seat and the other rearwardly of the seat and extending through the lateral surfaces of the body, a shaft rotatably mounted in each of said bearings, cylindrical shaft extensions at the ends of each shaft extending laterally outwardly beyond said bearings, a number of C-shaped leaf springs one for each shaft extension, said springs being of a width greater than their thickness and having an edge lying substantially in a vertical longitudinal plane, tubular sockets on the upper ends of said leaf springs and encircling said shaft extensions, fasteners extending through said sockets and shaft extensions and rigidly securing said springs to said shafts, and means engaging the lower ends of said springs for rigidly securing the same to said base.

6. In a riding toy having an elongated base, an elongated body overlying said base and extending in the same direction, a seat on said body supporting the rider in a position straddling the body, said body being narrower than long, the combination of bearing means extending transversely through the body at localities above the lowermost portions thereof and disposed one forwardly of the seat and the other rearwardly of the seat and extending through the lateral surfaces of the body, a shaft rotatably mounted in each of said bearings, shaft extensions at the ends of each shaft extending laterally outwardly beyond said bearings, a number of C-shaped leaf springs one for each shaft extension, said springs being of a width greater than their thickness and having an edge lying substantially in a vertical longitudinal plane, the upper ends of said springs being disposed in close proximity to said shaft extensions, fastening means engaging said shaft extensions and the upper ends of said springs and restraining relative movement therebetween, and fastening means connecting the lower ends of said leaf springs to said base.

7. A riding toy comprising a base, a body overlying and spaced from said base, a seat carried by said body, forward bearing means and rearward bearings means carried by said body, the axes of said bearing means being parallel, a shaft rotatably mounted in each of said bearing means, a shaft extension at each end of each shaft, a number of C-shaped leaf springs each having an edge lying substantially in a plane with its dimension measured along a line parallel to said plane being less than its dimension measured along a line normal to said plane, said springs having upper ends traversing and contacting said shaft extensions, bolts extending through the upper ends of said leaf springs and shaft extensions and engaging the same to hold the leaf springs rigidly attached to the shaft extensions, said leaf springs having lower ends overlying said base, and fastening means connecting the lower ends of said leaf springs to said base.

References Cited in the file of this patent

UNITED STATES PATENTS

| 115,158 | Bullock | May 23, 1871 |
| 329,570 | Kitchen | Nov. 3, 1885 |
| 1,289,382 | Brurock | Dec. 31, 1918 |
| 2,437,015 | Baltz | Mar. 2, 1948 |
| 2,452,869 | Richards | Nov. 2, 1948 |
| 2,651,881 | Glass et al. | Sept. 15, 1953 |
| 2,746,754 | Martel | May 22, 1956 |